(12) United States Patent
Segal et al.

(10) Patent No.: US 6,581,177 B1
(45) Date of Patent: Jun. 17, 2003

(54) MULTI-ACCESS, COLLISION-BASED COMMUNICATIONS

(75) Inventors: Mordechai Segal, Herzlia (IL); Ofir Shalvi, Herzlia (IL)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/303,333

(22) Filed: Apr. 30, 1999

Related U.S. Application Data
(60) Provisional application No. 60/083,905, filed on May 1, 1998.

(51) Int. Cl.[7] ............................................. H03M 13/00
(52) U.S. Cl. ...................................................... 714/751
(58) Field of Search ................................ 714/751, 758, 714/746

(56) References Cited

U.S. PATENT DOCUMENTS

| | | | | |
|---|---|---|---|---|
| 4,295,218 A | * | 10/1981 | Tanner ........................ | 714/762 |
| 5,610,916 A | * | 3/1997 | Kostreski et al. ............ | 370/487 |
| 5,721,733 A | * | 2/1998 | Wang et al. .................. | 370/332 |
| 5,883,928 A | * | 3/1999 | Eaton ........................... | 375/347 |
| 5,966,376 A | * | 10/1999 | Rakib et al. ................. | 370/342 |
| 5,968,197 A | * | 10/1999 | Doiron ......................... | 714/748 |
| 6,445,717 B1 | * | 9/2002 | Gibson et al. ............... | 370/473 |
| 6,487,690 B1 | * | 11/2002 | Schuster et al. ............ | 714/752 |

* cited by examiner

*Primary Examiner*—Albert Decady
*Assistant Examiner*—Esaw Abraham
(74) *Attorney, Agent, or Firm*—Tammy L. Williams; W. James Brady; Frederick J. Telecky, Jr.

(57) ABSTRACT

A collision-based multi-access system is described which is capable of recovering collisions by means of jointly detecting the mutually interfering signals, followed by re-transmission of functions of portions of some of the colliding signals. This system reduces the amount of required re-transmission of all of the colliding signals, decreasing the amount of re-transmission in the system, increasing the system throughput. The system is also applicable to non-colliding communications systems to correct interference due to noise.

19 Claims, 4 Drawing Sheets

| SYNC. WORD | SOURCE ID | TYPE | DATA | CRC |
FIG. 4
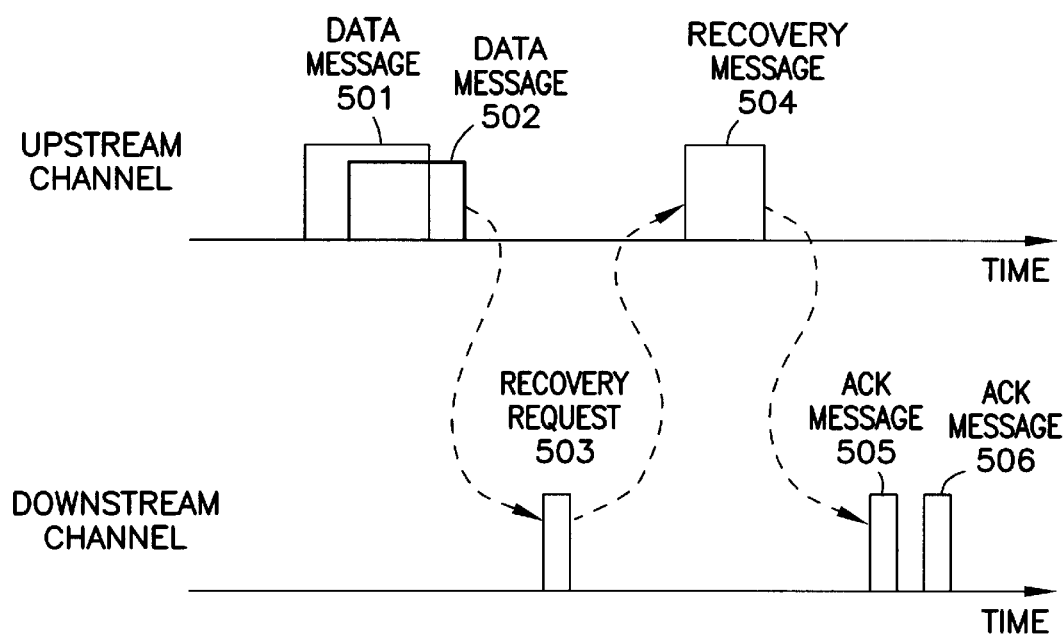
FIG. 5
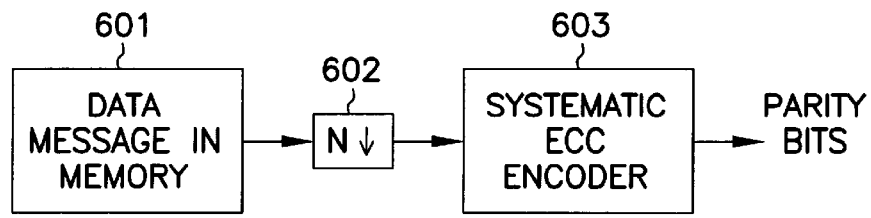
FIG. 6

MULTI-ACCESS, COLLISION-BASED COMMUNICATIONS

RELATED APPLICATION

The present is application is based upon U.S. Provisional Application Ser. No. 60/083,905, entitled "Method and Apparatus for Multi-Access Collision-Based Communications System" filed May 1, 1998. The present application claims the benefit of the earlier priority date under 35 U.S.C. §119(e).

COPYRIGHT NOTICE/PERMISSION

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawing hereto: Copyright ©1999, Libit Signal Processing, Ltd., All Rights Reserved.

TECHNICAL FIELD

The present invention is a multi-access collision based communications system that has a higher capacity than the existing collision-based communications systems.

BACKGROUND OF THE INVENTION

Collision-based, multi-access protocols are used in a variety of multi-user communications systems, including VSAT systems, 10 Mbbits/sec Ethernet local area networks (LAN), 100 Mbits/sec Ethernet LAN, and wireless networking systems. In such protocols, two or more transmitters may simultaneously transmit in overlapping frequency bands. In such a case, which is termed "signal collision", the receiver is incapable of detecting the transmitted data, and all the colliding signals are then retransmitted. The capacity of such systems may be degraded by a factor of 2.7 or more due to re-transmissions. There is a need in the art, therefore, to increase throughput in collision-based communications system.

SUMMARY OF THE INVENTION

The present invention solves many of the problems described above and many other problems in the communications field, which solutions will become known to those skilled in the art upon reading and understanding the present invention. The present invention is a collision-based multi-access system which recovers informnation involved in collisions by means of receivers jointly detecting the mutually interfering signals, followed by re-transmission of functions of portions of some of the colliding signals. In stead of re-transmission of all the colliding signals, the present invention enables decreasing the amount of re-transmission in the system, and therefore increasing the system throughput. The present invention is also applicable to non-colliding communications systems to correct interference due to noise.

BRIEF DESCRIPTION OF THE DRAWINGS

In the drawings, in which like reference numbers represent like components throughout the several views.

FIG. 4 depicts the content of a typical message transmitted in a communications system of the present invention;

FIG. 5 is a timing comparison of a sequence of messages in a communications system of the present invention; and FIG. 6 illustrates the structure of a recovery message encoder in the transmitters of the present invention.

DESCRIPTION OF THE PREFERRED EMBODIMENTS

In the following detailed description of the preferred embodiments, reference is made to the accompanying drawings which form a part hereof, and in which is shown by way of illustration specific embodiments in which the inventions may be practiced. These embodiments are described in sufficient detail to enable those skilled in the art to practice the invention, and it is to be understood that other embodiments may be utilized and that process or mechanical changes may be made without departing from the scope of the present invention. The following detailed description is, therefore, not to be taken in a limiting sense, and the scope of the present invention is defined only by the appended claims.

Figure 1:
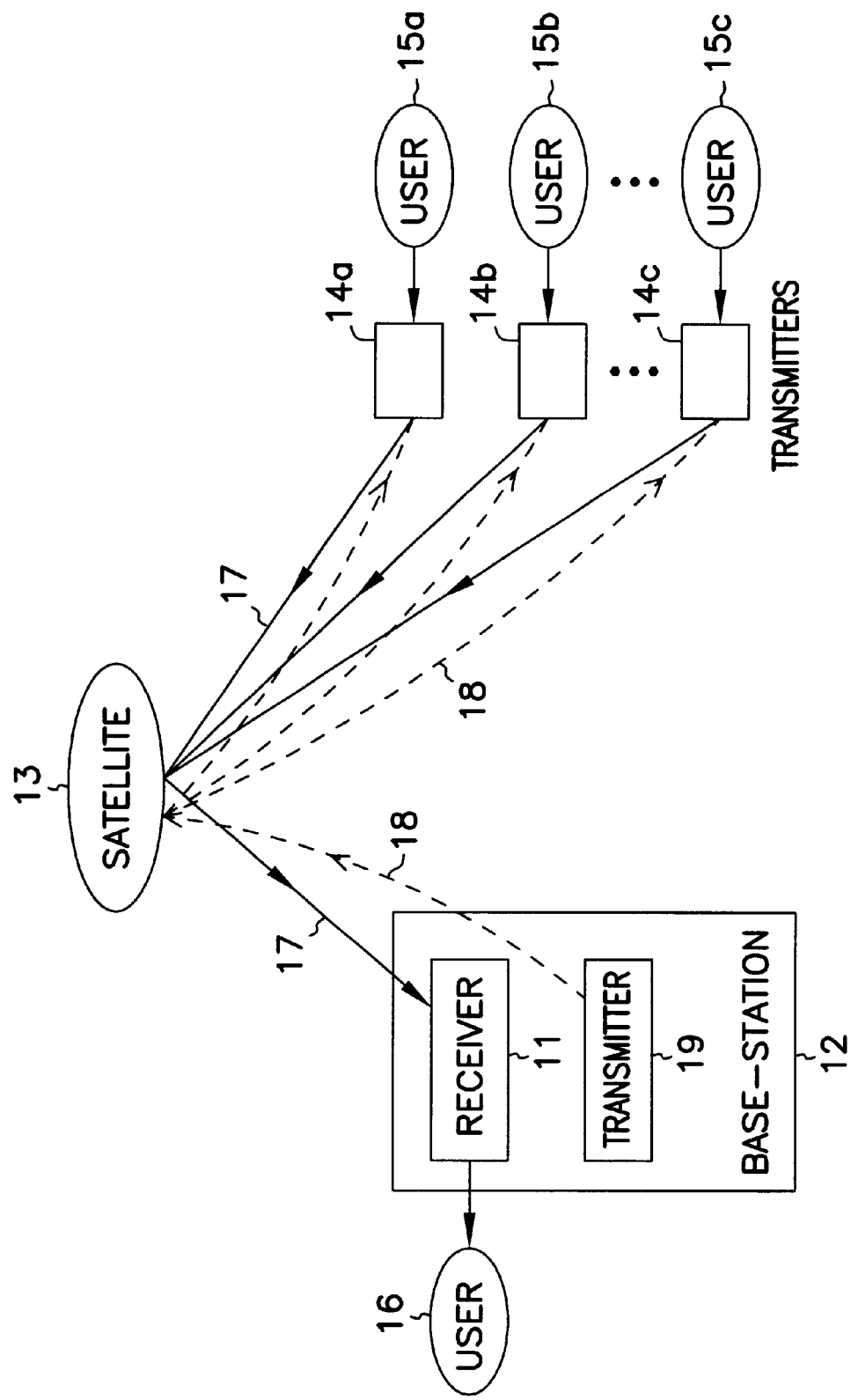
FIG. 1 is a block diagram of a satellite communications network used with an illustrative embodiment of the present invention.

FIG. 1 is a block diagram of a satellite communications network used with an illustrative embodiment of the present invention which is used to illustrate the principles and the structure of a satellite communications network with which the present invention may be practiced. Those skilled in the art will readily recognize, however, that the present invention may be practiced in a wide variety of collision-based communications systems which share a communications medium and in which transmitters asynchronously transmit messages which collide. Such systems include, by way of example and not by way of limitation, 10 Mbits/sec Ethernet local area networks (LAN), 100 Mbits/sec Ethernet LAN, and wireless networking systems.

The structure of a satellite communication system depicted in FIG. 1 consists of a receiver 11 which is integrated in a base-station 12, a satellite 13, and a plurality of transmitters 14a, 14b and 14c, collectively referenced as 14. Many more transmitters are possible but not illustrated here. The purpose of the satellite communication system of FIG. 1 is to reliably transmit signals from the transmitters 14a, 14b and 14c to the receiver 11, and to pass the information from users 15a, 15b and 15c, respectively, to user 16.

The transmitters 14a, 14b and 14c transmit data messages to the receiver 11 in a common upstream channel 17, which is a multi-access, collision-based channel. Two or more transmitters 14 may simultaneously use the same frequency band, and create mutual interference. Each message typically contains a synchronization (SYNC) word, a source identification (ID), type, a user data area, and an error detection code (such as circular redundant code or CRC code). The structure of this typical message is shown in FIG. 4 and may take the form of a packet of data.

There are typically two types of messages: regular data messages, and recovery messages. In one embodiment, the content of the recovery messages is one or more functions of portions of data messages that were sent earlier. The base station 12 uses a transmitter 19 on a downstream channel 18 to send control messages to the transmitters 14. Some of the control messages send an acknowledge code to the transmitters 14 about the reliable reception of data messages, while other control messages request a certain transmitter(s) 14 to transmit a function(s) of portions of data messages that it has sent before.

Figure 2:
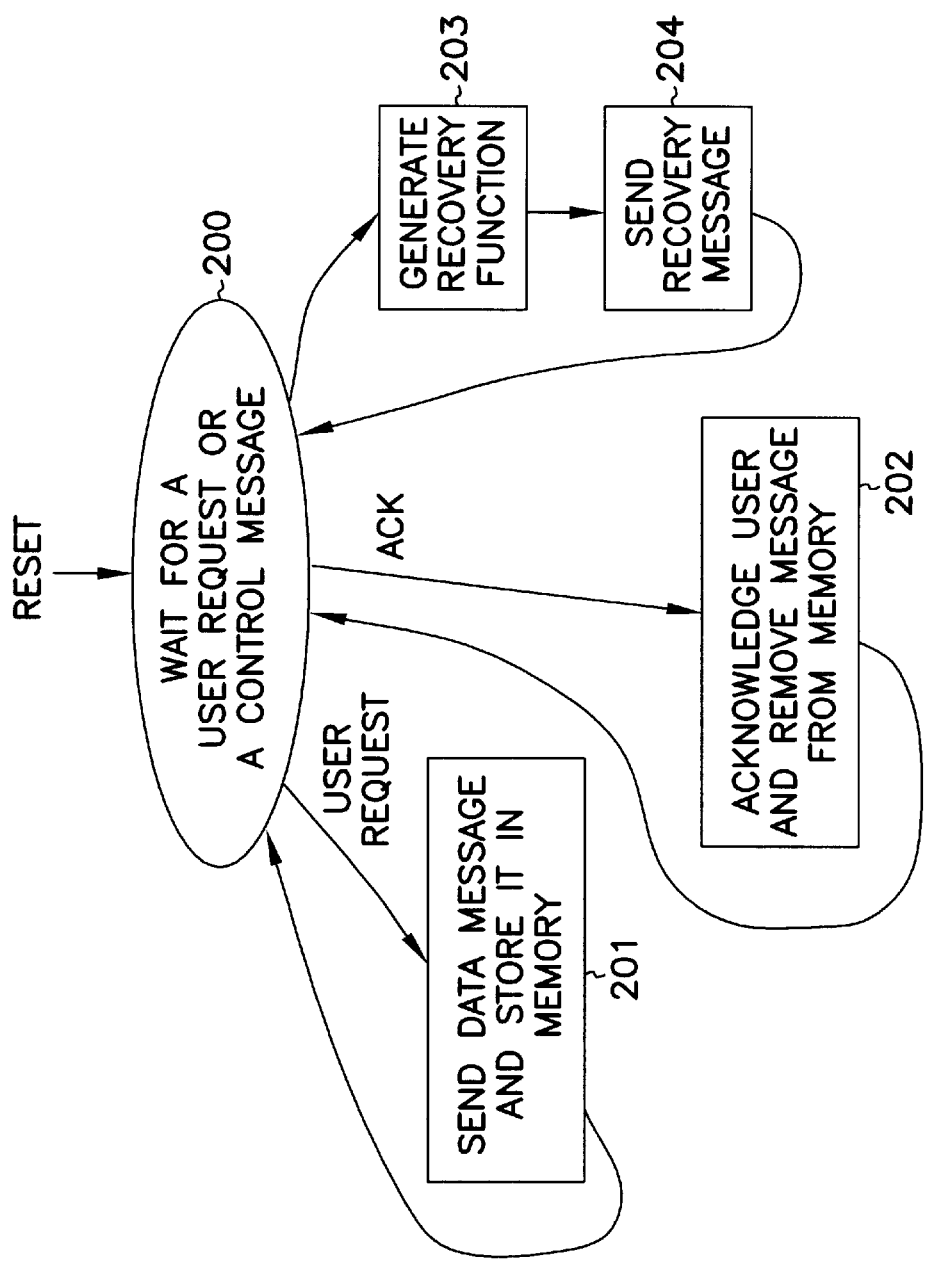
FIG. 2 is a state-machine flow chart of operation of a transmitter of the present invention.

The flow chart of the operation of a transmitter 14 that works according to the teaching of the present invention is shown in FIG. 2. Upon a request (200) from a user 15 which is connected to a transmitter 14, a data message is built which is subsequently transmitted in the upstream channel 17 according to state 201. The data message is also stored in memory at the transmitter 14 in state 201 of FIG. 2. If the transmitter 14 receives, from the downstream channel 18, a request to transmit functions of portions of a message, these functions are evaluated at state 203 and transmitted in the upstream channel 17 at state 204. If, however, the transmitter 14 receives from the downstream channel 18 an acknowledge message, the user's message or data is acknowledged for successful data transmission and the corresponding data message is removed from the transmitter's memory at state 202, so that the memory can be allocated for storing new messages.

Referring to FIG. 6, a system for generating recovery messages in the transmitter 14 is shown. The generation of a recovery message is performed by taking every Nth bit (where N is a positive integer) of the data 602 that is stored in the message memory 601 of transmitter 14, feeding that bit into a systematic error-correction-code (ECC) encoder 603, and transmitting the parity bits of the ECC code which are generated by the encoder 603. The ECC being used may be, for example, Reed-Solomon ECC, or any systematic convolutional code. A particular case of ECC is a repetition code, in which case the parity bits are equal to the encoder's input bits, so that the recovery message consists of every Nth bit of portions of the data message.

Figure 3:
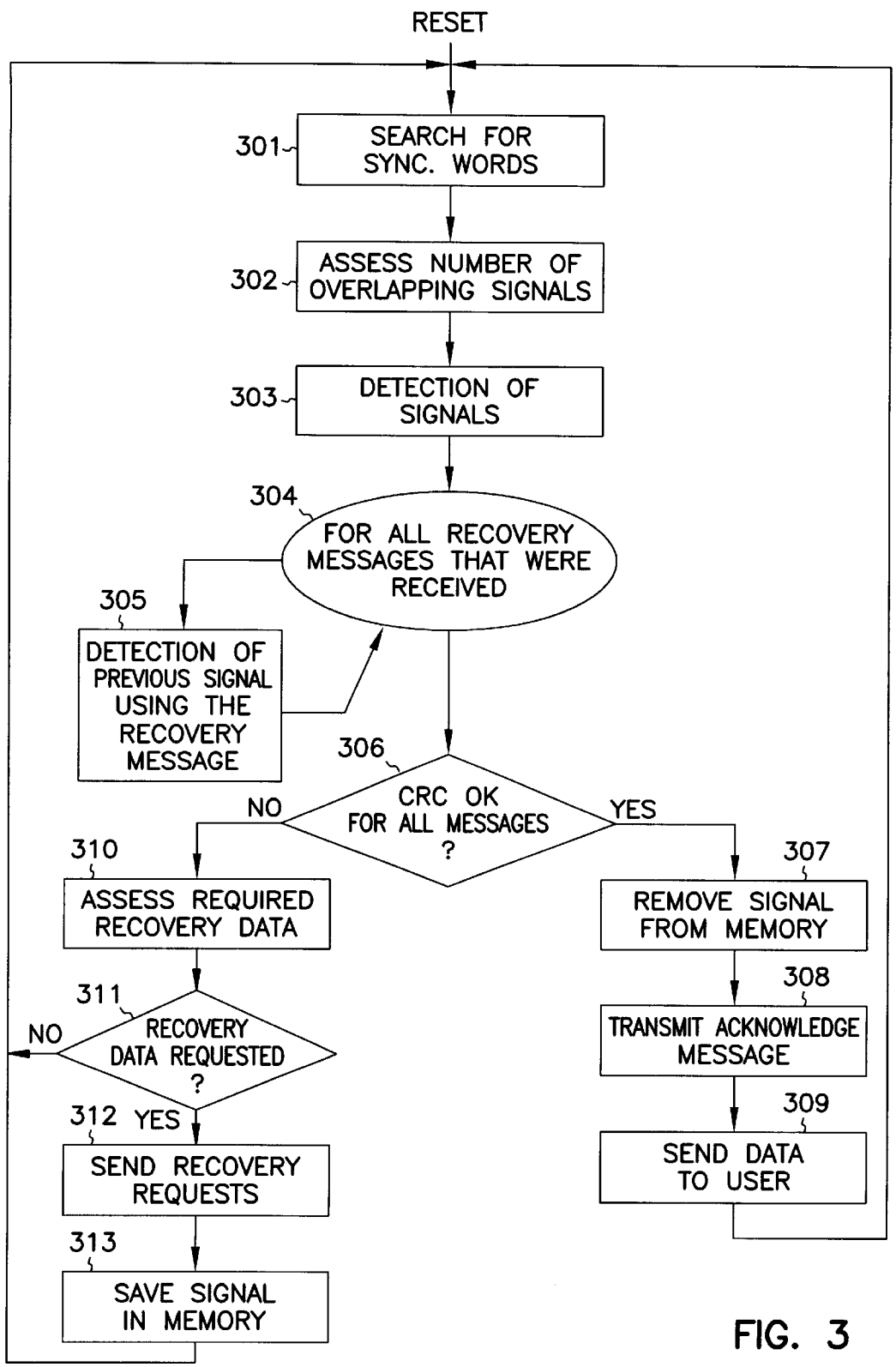
FIG. 3 is a flow chart of the operation of a corresponding receiver of the present invention.

The flow chart of the operation of a receiver that works according to the present invention is shown in FIG. 3. The receiver iterates in a loop. The first step in this loop is the search for synchronization words at 301. This is done by applying a correlator, which is matched to the synchronization signal, and searching for peaks at the output of the correlator. The receiver estimates the number of simultaneous overlapping transmissions by detecting multiple peaks that appear at the output of the synchronization word correlator at 302. The receiver then detects the content of the incoming messages by applying an algorithm for joint detection of M mutually interfering signals, the general type of which can be found in U.S. Pat. No. 5,710,797 issued Jan. 20, 1998, entitled "Method and Apparatus for Digital Communication in the Presence of Closely Spaced Adjacent Channels", assigned to Libit Signal Processing Ltd., the same assignee of the present invention, and which is hereby incorporated by reference. One skilled in the art will readily recognize that the general considerations described in U.S. Pat. No. 5,710,797 can be also applied to fully overlapped signals.

Referring once again to FIG. 3, if the estimated number of overlapping signals equals one, that is, there are no collisions, then a standard detection algorithm at 303 may be applied by the receiver. The receiver may decide to avoid applying a detector on the data, in case the number of mutually interfering signals or their power levels indicate low probability of acceptable detection. Those skilled in the art will also recognize that all subsequent operations shown in FIG. 3 may be also applied in the case where there is no mutual interference, but the single signal could not be detected due to, for example, random noise, in, for example, a non-collision-based system. For all newly received messages that were identified as recovery messages at 304, the receiver applies a detector on the corresponding previous received signal whose samples are stored in the receiver's memory, making a use of the new information contained in the recovery message at 305. For example, if the information contained in the recovery message is every Nth bit of a portion of a data message, and the signal is encoded using a convolutional-type code, then the auxiliary information may be inserted into a Viterbi-like decoding algorithm, where inconsistent states and branches on the trellis diagram are eliminated.

If the information in a recovery message is a portion of a signal, then the changes in signal parameters (timing phase, carrier phase, amplitude, channel impulse response, etc.) occurring between the time of the first transmission and the time of the re-transmission, may be estimated and compensated to retrieve the original message. The re-transmitted signal is subtracted from the initially received signal, so that the mutual interference is reduced and other signals that collided with the above signal may be detected. If the information in a recovery message contains ECC parity bits on every Nth bit of a portion(s) of the data, then the receiver may iterate between using these parity bits to correct detector output bits, and applying the detector again with the corrected bits fed as side information.

The next step of the algorithm in the receiver is to test if all data messages in the newly received signal, and, if applicable, in the signal that may have been re-detected using a newly received recovery message, have been detected with a valid CRC field at 306. If the CRC is valid, the corresponding signal is removed from the receiver's memory at 307, so that the memory can be allocated for samples of other received signals. Then, acknowledge messages are sent in the downstream channel to confirm accurate data reception at 308, and the received data is transferred to the user at 309.

If messages were detected with an invalid CRC, then the receiver assesses the amount and type of additional auxiliary information required for reliable detection of the received signal at 310. If the receiver decides to use additional auxiliary data at 311, it sends requests in the downstream channel for certain transmitters to transmit functions of portions of a data message(s) that was received incorrectly at step 312, and the receiver keeps the associated received signals in memory for later processing at 313.

FIG. 5 depicts an example of some messages that are sent in the communications channel with which the present invention operates. Referring to both FIG. 1 and FIG. 5, messages 501 and 502 are sent simultaneously in the same frequency range in the upstream channel 17 by two transmitters, and since the receiver 11 does not succeed to detect these messages, it sends, in the downstream channel 18, a request 503 for transmitting a function(s) of the data message 501. The corresponding transmitter then generates the function of the data message 501 and transmits a recovery message 504 in the upstream channel 17. Using message 504 as auxiliary data, the receiver jointly detects messages 501 and 502, obtains valid CRC, and transmits acknowledge messages 505, 506 in the downstream channel to confirm reception of messages 501 and 502. Of course, there my be more than two collisions in a transmission, such as three or more transmitters 14 attempting to send messages at the same time. In this case, the present invention will operate on all colliding messages and correct all overlapping signals.

In another embodiment of the present invention, the content of the recovery message 504 consists of the retransmission of only the overlapping portion of data message 501 and data message 502. In this embodiment, the content of both message 501 and 502 can be reconstructed using the overlapping portion from either message 501 or 502. In this case, the changes in signal parameters (timing phase, carrier phase, amplitude, channel impulse response, etc.) occurring between the time of the first transmission 501, 502 and the time of the transmission of the recovery message 504, may be estimated and compensated to retrieve the original message. The recovery message signal in its analog form is subtracted from the initially received analog signal, so that the mutual interference is reduced and other signals that collided with the above signal may be detected.

Those skilled in the art will readily recognize that the present invention may be used in a non-collision-based communication system where messages are corrupted by noise, fading and other forms of interference. In such a system, the messages can be corrected with recovery messages which are smaller and hence use less bandwidth than a retransmission of the entire message. Those skilled in the art will also readily recognize that the present invention may be used in a non-feedback communication system (such as a simplex system) where recovery messages are always automatically sent under the assumption that the recovery messages are used if there is a collision, or they are discarded by the receiver if there are no collisions.

The present invention also enables reduced channel spacing in collision-based digital communication systems and thereby increases the system capacity (i.e. the number of users per bandwidth unit) without incurring any significant loss in system performance (e.g. power margins, BER, and channel availability). It also allows a reduced power margin that may be required to maintain a pre-specified performance level without sacrificing system capacity.

CONCLUSION

Although specific embodiments have been illustrated and described herein, it will be appreciated by those of ordinary skill in the art that any arrangement which is calculated to achieve the same purpose may be substituted for the specific embodiments shown. Many adaptations of the invention will be apparent to those of ordinary skill in the art. For example, the present invention may be utilized in cable TV modems, Ethernet networks and the like. The upstream and downstream channels my consist of different media such as wire and wireless. The upstream channel and downstream channels may also be the same with collisions occurring in both directions. The recovery messages may also be subject to collisions and the system may work in a full duplex environment. Accordingly, this application is intended to cover any adaptations or variations of the invention. It is manifestly intended that this invention be limited only by the following claims and equivalents thereof.

What is claimed is:

1. A digital communications system, comprising:
    a first location having a first transmitter operable for sending first digital data and having a first receiver operable for receiving a request for transmission of a recovery message associated with the first digital data;
    a second location having a second receiver operable for receiving the first digital data and having a second transmitter operable for sending the request for transmission of the recovery message associated with the first digital data;
    the second location further having a second processor connected to the second receiver and the second transmitter, and operable for:
        detecting errors in the first digital data received from the first location;
        selecting a portion of the first digital data to request in the recovery message associated with the first digital data;
        sending the request for transmission of the recovery message associated with the first digital data to the first location;
        receiving the recovery message associated with the first digital data, and obtaining thereby function of the portion of the first digital data;
        correcting the errors in the first digital data in response to the function of the portion of the first digital data;
    the first location further having a first processor connected to the first transmitter and the first receiver, and operable for:
        receiving the request for transmission of the recovery message associated with the first digital data from the first location,
        calculating the function of the portion of the first digital data; and
        sending the function of the portion of the first digital data to the second location in the recovery message associated with the first digital data.

2. The digital communications system according to claim 1 further including:
    a third location having a third transmitter operable for sending third digital data which collides during transmission with the first digital data; and
    wherein the processor of the second location is further operable for correcting errors in the third digital data in response to the function of the portion of the first digital data.

3. The digital communications system according to claim 2 wherein the function of the portion of the first digital data are used in an iterative fashion as side data to correct detector output bits and applying the detector again with corrected bits fed as side information.

4. The digital communications system according to claim 1 further including:
    a third location having a third transmitter operable for sending third digital data which collides during transmission with the first digital data, the third location further having a third receiver operable for receiving a request for transmission of a recovery message associated with the third digital data; and
    wherein the processor of the second location is further operable for correcting errors in the third digital data in response to the function of the portion of the first digital data and in response to the function of the portion of the third digital data.

5. The digital communications system according to claim 4 wherein the function of the portion of the first digital data and the function of the portion of the third digital data are used in an iterative fashion as side data to correct detector output bits and applying the detector again with corrected bits fed as side information.

6. The digital communications system according to claim 1 in which the function of the portion of the first digital data is every Nth bit of information in the portion of the first digital data, where N is a positive integer.

7. The digital communications system according to claim 1 in which the function of the portion of the first digital data is an output of a systematic error correction code applied to every Nth bit of information in the first digital data, where N is a positive integer.

8. The digital communications system according to claim 1 further including a satellite for transferring the first digital data from the first location to the second location.

9. The digital communications system according to claim 1 further including a local area network for transferring the first digital data from the first location to the second location.

10. The digital communications system according to claim 1 further including a cable television communications network for transferring the first digital data from the first location to the second location.

11. The digital communications system according to claim 1 wherein the first digital data and the requests for retransmission share the same communications channel.

12. A method of correcting errors in a communications system, comprising:
   detecting an erroneous message;
   storing the erroneous message;
   selecting a portion of an original message associated with the erroneous message to request in a recovery message;
   receiving the recovery message which includes a function of the portion of the original message corresponding to the erroneous message; and
   correcting the erroneous message utilizing the function of the portion of the original message.

13. The method according to claim 12, wherein information contained in the recovery message is every Nth bit of a portion of the original message, and wherein correcting further comprises inserting the function of a portion of the original message into a Viterbi-like decoding algorithm, where inconsistent states and branches on a trellis diagram are eliminated.

14. A method of correcting errors in a communications system, comprising:
   detecting an erroneous message in a signal;
   storing the erroneous message by keeping a digital copy of the signal of the erroneous message in memory;
   selecting a portion of an original message associated with the erroneous message to request in a recovery message;
   receiving a signal of a recovery message which is the portion of the original message corresponding to the erroneous message;
   storing a digital copy of the signal of the recovery message;
   adjusting the parameters of the digital copy of the signal of the erroneous message and the parameters of the digital copy of the signal of the recovery message; and
   correcting the erroneous message utilizing the recovery message.

15. A method of generating a recovery packet, comprising:
   taking every Nth bit of a message and feeding the message to a systematic error correction-code (ECC) encoder;
   generating parity bits from the ECC encoder on every Nth bit; and
   placing the parity bits into a recovery packet.

16. A digital communications transceiver, comprising:
   a transmitter operable for sending a message packet and for sending a recovery packet;
   a receiver operable for receiving a request for the recovery packet;
   a processor connected for controlling the receiver and the transmitter and operable for:
      sending the message packet;
      selecting a portion of the message packet to request in a recovery packet;
      receiving the request for the recovery packet;
      calculating a function of the portion of the message packet; and
      sending the function of the portion of the message packet.

17. The transceiver according to claim 16 wherein the processor is further operable for:
   taking every Nth bit of the message packet;
   feeding the message to a systematic error correction code encoder;
   generating parity bits from the encoder; and
   placing the parity bits into the recovery packet.

18. A digital communications transceiver, comprising:
   a receiver operable for receiving a message packet and for receiving a recovery packet;
   a transmitter operable for sending a request for the recovery packet;
   a processor connected for controlling the receiver and the transmitter and operable for:
      detecting errors in the message packet;
      selecting a portion of the message packet to request in a recovery packet;
      sending a request for transmission of the recovery packet;
      receiving the recovery packet and obtaining therefrom function of a portion of an original message packet associated with the portion of the message packet requested in the recovery packet; and
      correcting the errors in the message packet.

19. The transceiver according to claim 18, wherein information contained in the recovery packet is every Nth bit of a portion of the original message packet, and wherein the process inserts the function of a portion of the original message into a Viterbi-like decoding algorithm wherein inconsistent states and branches on a trellis diagram are eliminated.

* * * * *